US009256688B2

(12) United States Patent
Hummel et al.

(10) Patent No.: US 9,256,688 B2
(45) Date of Patent: Feb. 9, 2016

(54) RANKING CONTENT ITEMS USING PREDICTED PERFORMANCE (71) Applicant: Google Inc., Mountain View, CA (US)

(72) Inventors: Patrick Hummel, Cupertino, CA (US); Randolph P. McAfee, San Marino, CA (US); Joshua V. Dillon, Sunnyvale, CA (US); Christopher K. Harris, Santa Clara, CA (US); Timothy S. Lipus, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 13/963,242

(22) Filed: Aug. 9, 2013

(65) Prior Publication Data
US 2015/0046467 A1  Feb. 12, 2015

(51) Int. Cl.
  *G06F 17/30* (2006.01)
  *G06Q 30/02* (2012.01)
(52) U.S. Cl.
  CPC .......... *G06F 17/30867* (2013.01); *G06Q 30/02* (2013.01); *G06Q 30/0242* (2013.01); *G06Q 30/0246* (2013.01); *G06Q 30/0247* (2013.01); *G06Q 30/0251* (2013.01); *G06Q 30/0275* (2013.01)
(58) Field of Classification Search
  CPC .............. G06Q 30/02; G06Q 30/0242; G06Q 30/0275; G06Q 30/0247; G06Q 30/0246; G06Q 30/0251
  USPC ............... 707/711, 728, 748, 749; 705/14.41, 705/14.42, 14.43, 14.45, 14.49, 14.58
  See application file for complete search history.

(56) References Cited

U.S. PATENT DOCUMENTS

| 6,175,824 | B1 * | 1/2001 | Breitzman et al. ........... 705/36 R |
| 6,269,361 | B1 * | 7/2001 | Davis et al. ............................ 1/1 |
| 7,647,242 | B2 * | 1/2010 | Bem ................. G06F 17/30967 705/14.26 |
| 7,727,340 | B2 * | 6/2010 | Chung et al. .................. 148/33.3 |
| 8,156,002 | B2 * | 4/2012 | van Zwol et al. .......... 705/14.41 |
| 8,255,386 | B1 * | 8/2012 | Annau et al. .................. 707/711 |
| 8,271,325 | B2 * | 9/2012 | Silverman et al. ........... 705/14.1 |

(Continued)

OTHER PUBLICATIONS

Lahaie, S., "Revenue Analysis of a Family of Ranking Rules for Keyword Auctions," FCRC'11: Federated Computing Research Conference, Proceedings of the 8th ACM Conference on Electronic Commerce; pp. 50-56, 2011.

(Continued)

*Primary Examiner* — Frantz Coby
(74) *Attorney, Agent, or Firm* — Fish & Richardson P.C.

(57) ABSTRACT

Methods, systems, and apparatus, including computer programs encoded on a computer storage medium, for ranking content items. In one aspect, a method includes identifying, for a content item, a bid value specifying an amount a content item provider is willing to pay for user interaction with the content item. A predicted performance measure is identified for the content item. The predicted performance measure is adjusted based on a weighting factor for the content item. The weighting factor for the content item is indicative of confidence that the predicted performance measure will match an actual performance measure for the content item and can be different than a weighting factor for another content item identified for inclusion in a ranking with the content item. A rank score is determined for the content item using the bid value and adjusted predicted performance measure. The content item is provided based on the rank score.

20 Claims, 5 Drawing Sheets

(56) References Cited

U.S. PATENT DOCUMENTS

| | | | | |
|---|---|---|---|---|
| 8,326,806 | B1* | 12/2012 | Baratloo | G06F 17/30699 707/688 |
| 8,498,955 | B2* | 7/2013 | Karlsson et al. | 706/45 |
| 8,543,446 | B2* | 9/2013 | Richardson | G06Q 30/0201 705/7.31 |
| 8,600,809 | B1* | 12/2013 | Kubica | G06Q 30/02 705/14.41 |
| 8,645,390 | B1* | 2/2014 | Oztekin et al. | 707/748 |
| 8,666,877 | B2* | 3/2014 | Kumar et al. | 705/37 |
| 8,725,566 | B2* | 5/2014 | Mukherjee et al. | 705/14.41 |
| 2002/0055866 | A1* | 5/2002 | Dewar | 705/8 |
| 2005/0246299 | A1* | 11/2005 | Scarborough et al. | 706/21 |
| 2006/0248035 | A1* | 11/2006 | Gendler et al. | 707/1 |
| 2008/0015910 | A1* | 1/2008 | Reisz et al. | 705/7 |
| 2010/0138291 | A1* | 6/2010 | Silverman et al. | 705/14.45 |
| 2010/0262602 | A1* | 10/2010 | Dumon et al. | 707/728 |
| 2011/0010239 | A1* | 1/2011 | Vijay et al. | 705/14.42 |
| 2011/0270845 | A1* | 11/2011 | Lin et al. | 707/748 |
| 2012/0005016 | A1* | 1/2012 | Graff | 705/14.49 |
| 2012/0005023 | A1* | 1/2012 | Graff | 705/14.58 |
| 2012/0084140 | A1* | 4/2012 | Kwon et al. | 705/14.42 |
| 2013/0132194 | A1* | 5/2013 | Rajaram | G06Q 50/01 705/14.52 |
| 2013/0159110 | A1* | 6/2013 | Rajaram | G06Q 50/01 705/14.66 |
| 2013/0304623 | A1* | 11/2013 | Kumar et al. | 705/37 |
| 2013/0325590 | A1* | 12/2013 | Shekhawat et al. | 705/14.43 |

OTHER PUBLICATIONS

Lahaie and McAfee, "Efficient Ranking in Sponsored Search", WINE'11 Proceedings of the 7$^{th}$ International Conference on Internet and Network Economics; pp. 254-265, 2011.

* cited by examiner

RANKING CONTENT ITEMS USING PREDICTED PERFORMANCE

BACKGROUND

This specification relates to data processing.

The Internet enables access to a wide variety of resources. For example, video, audio, web pages directed to particular subject matter, news articles, images, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages). An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

SUMMARY

In general, one innovative aspect of the subject matter described in this specification can be embodied in methods that include the actions of identifying, for a content item, a bid value specifying an amount a content item provider is willing to pay for user interaction with the content item; identifying, for the content item, a predicted performance measure specifying a predicted performance for the content item; adjusting the predicted performance measure to generate an adjusted predicted performance measure, the adjusting being based on a weighting factor for the content item, the weighting factor for the content item being indicative of a confidence that the predicted performance measure will match an actual performance measure for the content item, the weighting factor for the content item being different than a weighting factor for another content item identified for inclusion in a ranking with the content item; determining a rank score for the content item using the bid value for the content item and the adjusted predicted performance measure for the content item; and providing the content item in response to a content item request based on the rank score for the content item. Other embodiments of this aspect include corresponding systems, apparatus, and computer programs, configured to perform the actions of the methods, encoded on computer storage devices.

These and other embodiments can each optionally include one or more of the following features. Aspects can include adjusting the weighting factor based on at least one of a type of the content item, a selection count for the content item that specifies a number of times the content item has been selected in response to being displayed, and an impression count for the content item that specifies a number times the content item has been displayed.

Aspects can include adjusting the weighting factor based on at least one of a selection count that specifies a number of times a second content item that has a particular characteristic in common with the content item has been selected in response to being displayed and an impression count that specifies a number of times that the second content item has been displayed.

Aspects can include identifying a first predicted performance measure for the content item using a first machine learning system; identifying a second predicted performance measure for the content item using a second machine learning system different than the first machine learning system; and adjusting the weighting factor based on a difference between the first predicted performance measure and the second predicted performance measure.

The weighting factor can be based on a predicted performance measure for each content item in a set of content item and an actual performance measure for each content item in the set of content items. Aspects can include identifying, for inclusion in the set of content items, content items that have a same particular characteristic as the content item.

The weighting factor can be proportional to a first variance value divided by a sum of the first variance value and a second variance value. The first variance value can be proportional to a variance in actual function values for two or more content items of the set of content items. The actual function value for a particular content item of the two or more content items can be a function of an average actual performance measure for the particular content item. The second variance value can be proportional to a variance in difference values for the two or more content items. The difference value for the particular content item can be a difference between a predicted function value and the actual function value for the particular content item. The predicted function value can be a function of an average predicted performance measure for the particular content item.

Adjusting the predicted performance measure for the content item can include raising the predicted performance measure for the content item by an exponent with a value proportional to the weighting factor. Adjusting the predicted performance measure for the content item can include adjusting the predicted performance measure using a first adjustment factor. The first adjustment factor can be proportional to a first adjustment value raised by an exponent. The first adjustment value can be proportional to an exponential function of an average value. The average value can specify an average of the actual function values for the two or more content items. The exponent can be proportional to a difference between a constant and the weighting factor.

Adjusting the predicted performance measure for the content item can include adjusting the predicted performance measure using a second adjustment factor. The second adjustment factor can be proportional to an exponential function of a second adjustment value. The second adjustment factor can be proportional to a variance product divided by a variance sum. The variance product can be proportional to a product of the first variance value and the second variance value. The variance sum can be proportional to a sum of the first variance value and the second variance value.

Particular embodiments of the subject matter described in this specification can be implemented so as to realize one or more of the following advantages. The loss resulting from mispredicting a performance measure can be reduced by adjusting a weighting of a predicted performance measure for a content item relative to a bid value for the content item and generating a ranking based on a combination of the predicted performance measure and the bid value. For example, reducing the weighting of a predicted performance measure for which there is a low level of confidence in the prediction reduces the loss that results from mispredicting the performance measure. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Content items (e.g., online advertisements, audio files, and/or video files) are selected for presentation in response to content item requests based, in part, on rank scores for the content items. The rank score for a content item can be based on a bid specifying a value that a content item provider is willing to pay in response to a user interaction with the content item. The rank score can also be based on a predicted performance measure that specifies a predicted performance (e.g., click-through rate) for the content item. For example, the rank score for an advertisement may be proportional to the product of the predicted click-through rate and the bid value for the advertisement, which represents a predicted value of presenting the advertisement.

In some implementations, the predicted performance measure can be weighted (e.g., adjusted) based on a level of confidence that the predicted performance measure matches an actual performance measure for the content item. The weighting of the predicted performance measure for a content item can be varied or adjusted relative to the weighting of the bid value for the content item based on the level of confidence. For example, the confidence in a predicted performance measure for a new content item may be lower than the confidence in a predicted performance measure for a content item that has been in use for a longer period of time. The confidence difference can be due to the difference in the amount of data that is available to determine the predicted performance measures. For example, the difference between an amount of available data for the new content item and the content item that has been in use longer may be statistically significant. Therefore, the confidence in values computed using the available data for the new content item can generally be lower than the confidence in values computed using the available data for the content item that has been in use longer. Accordingly, the predicted performance measure for the new content item may be given less weight in determining a rank score for the new content item than the weight given to the predicted performance measure for the content item that has been in use.

The predicted performance measure for a content item may be weighted (e.g., adjusted) using a weighting factor that is based on predicted performance measures and actual performance measures of a set of content items. For example, the weighting factor for a content item may be based on a variance in the predicted and actual performance measures of content items that have similar characteristics (e.g., same type of content item, same advertiser or other provider, same topic or category, and/or other characteristics).

The predicted performance measure for a content item may also be adjusted using one or more adjustment factors. For example, after weighting the predicted performance measure for the content item, the weighted predicted performance measure may be scaled using one or more adjustment factors. The adjustment factors can scale the weighted predicted performance measure such that a rank score that is based on the weighted predicted performance measure and an interaction-based bid value is consistent (e.g., comparable to) rank scores that are based on impression-based bid values. The adjustment factors can be based on predicted performance measures and actual performance measures of content items in a set of content items.

The weighting factor and/or the adjustment factors for a content item can be adjusted based on characteristics of the content item. For example, the characteristics of a content item can include the type of content item (e.g., text, video, or image), the number of interactions the content item has received, the number of times the content item has been presented, and/or the number of impressions or user interactions that similar content items have received. The weighting factor and/or the adjustment factors for a content item can also be adjusted based on differences between predicted performance measures determined by multiple predictors that use different methodologies to predict performance measures.

As described above, the predicted performance measure for a content item having an interaction-based bid can be adjusted to make the rank score consistent with (e.g., comparable to) rank scores for other content items having bids that are based on impressions rather than interactions. For example, an auction process (or another selection process) used to select content items for presentation may be performed using bids for content items that have an associated impression-based bid and content items that have an associated interaction-based bid.

Figure 1:
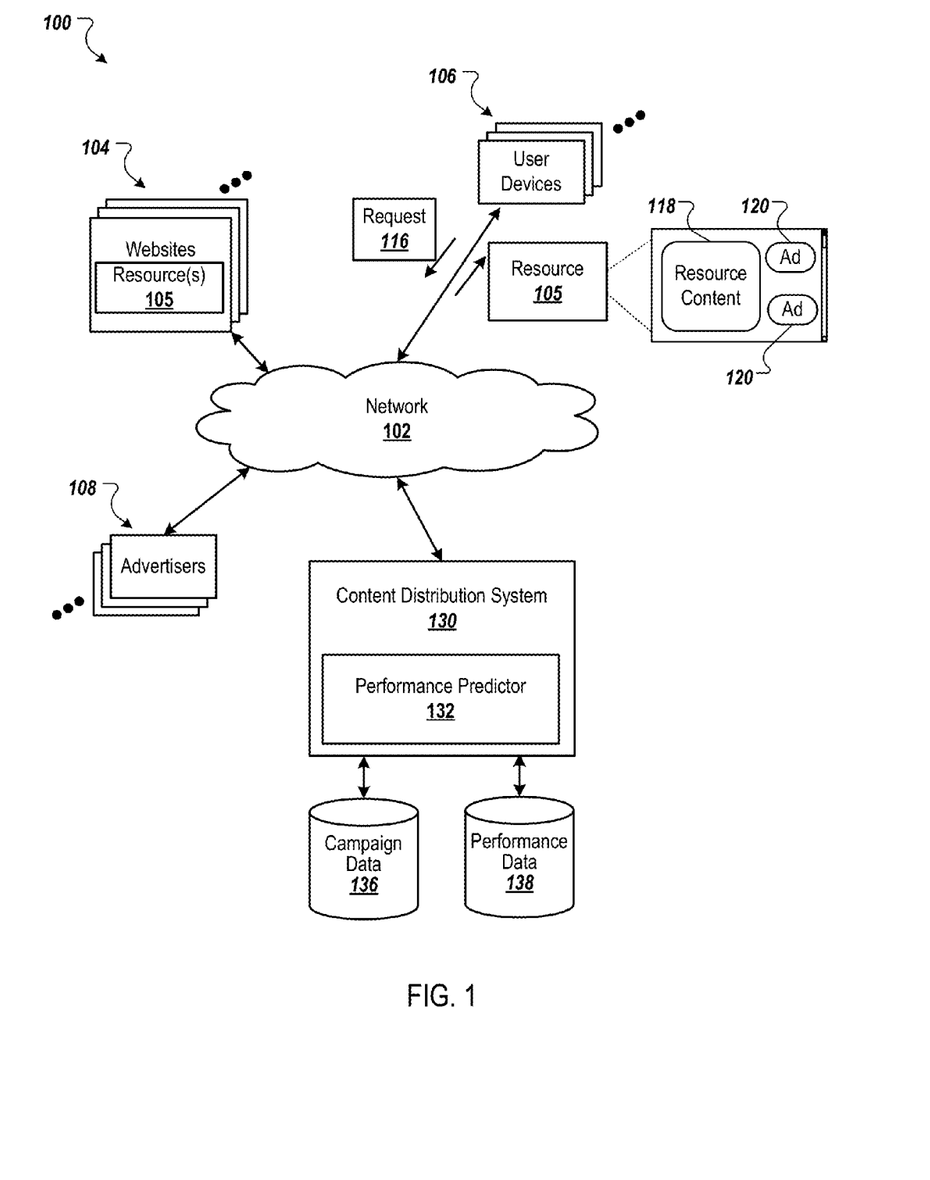
FIG. 1 is a block diagram of an example environment in which a content distribution system distributes content.

FIG. 1 is a block diagram of an example environment 100 in which a content distribution system 130 distributes content to user devices 106. The example environment 100 includes a network 102 such as a local area network (LAN), wide area network (WAN), the Internet, or a combination thereof. The network 102 connects websites 104, user devices 106, advertisers 108, and the content distribution system 130. The example environment 100 may include millions of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website 104.

A resource 105 is data provided by the website 104 over the network 102 and that is associated with a resource address. Resources include HTML pages, word processing documents, and portable document format (PDF) documents, images, video, and feed sources, to name only a few. The resources can include content 118, e.g., words, phrases, images and sounds that may include embedded information (such as meta-information in hyperlinks) and/or embedded instructions (such as scripts).

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can include resource content 118 (e.g., text, images, videos, etc. of the resource 105) and content item slots 120 (e.g., advertisement slots). When a resource 105 having a content item slot 120 is requested by a user device 106, the content distribution system 130 receives a content item request 116 requesting content items to be provided with the resource content 118.

A content item request 116 can include data regarding the content item slots 120 (e.g. size or type of content item slot), data regarding the resource 105 on which the content item will be presented (e.g., category or keywords found on the resource, data regarding publisher of resource, etc.), and/or other data. If the content items are to be presented in content item slots 120 of a search results page, the content item request 116 may include keywords of a search query submitted to a search system.

The content distribution system 130 allows advertisers 108 or other content item providers to define campaign rules that take into account attributes of content item slots and resources on which content items (e.g., advertisements) are to be presented. Example campaign rules include keyword rules, in which an advertiser 108 provides bids for keywords that are present in either search queries or resource content 118. A bid represents a value that an advertiser 108 is willing to pay in response to a presentation of the advertisement (e.g., cost per impression bid) or an interaction with the advertisement (e.g., cost per click bid). Advertisements that are associated with keywords having bids that result in a content item slot 120 being awarded in response to an auction (or another selection process) are selected for displaying in the content item slots 120. Example processes for selecting advertisements (or other content items) for display in content item slots 120 based on bids and predicted performance measures are described in detail below.

When a user of a user device 106 selects an advertisement, the user device 106 generates a request for a landing page of the advertisement, which is typically a web page of the advertiser 108. For example, the advertisers 108 may each have respective web pages, some of which are landing pages for the advertisements of the advertisers 108.

The content distribution system 130 includes a data storage system that stores campaign data 136, and performance data 138. The campaign data 136 stores content items (e.g., advertisements), campaign information, bid values for content items, and budgeting information for advertisers 108. The performance data 138 stores data indicating the performance of the content items that are served. Such performance data can include, for example, click-through rates for content items, the number of impressions for content items, and the number of conversions for content items (e.g., purchase of a product in response to the display of an advertisement). Other performance data can also be stored.

The content distribution system 130 also includes a performance predictor 132 that predicts or estimate performance measures (e.g., click-through rates or conversion rates) for content items. The performance predictor 132 can predict the performance of a content item using data regarding the content item, such as historical performance data and/or characteristics of the content item (e.g., type of content item, category of subject matter, or size). The predicted performance measure may also be based on characteristics of content item slots in which the content item may be displayed, and/or characteristics of the advertiser 108 or other content item provider associated with the content item. For example, the performance predictor 132 may predict the performance of content items in response to receiving a content item request 116.

The performance predictor 132 can also weight or adjust the predicted performance measure for a content item, for example based on a level of confidence that the predicted performance measure will match an actual performance measure for the content item. For example, the performance predictor 132 may reduce the weighting of a predicted performance measure for advertisement content item relative to the weighting of a bid value for the content item if the confidence level for the content item's predicted performance measure is low (e.g., lower than a threshold confidence level). Thus, in this example, the bid value may be given more weight than the predicted performance measure when determining a rank score for the content item.

Figure 2:
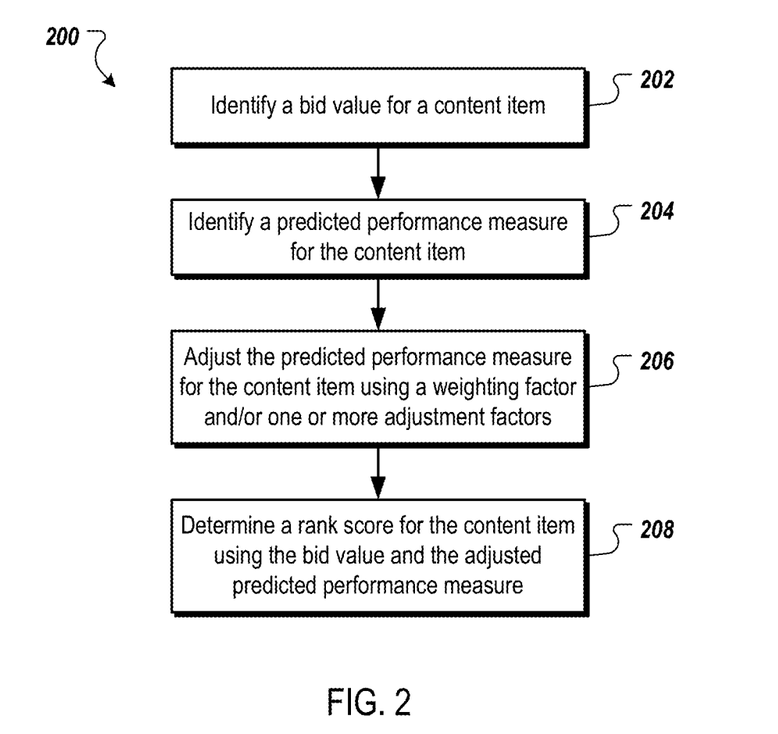
FIG. 2 is a flow chart of a process for determining a rank score for a content item.

FIG. 2 is a flow chart of an example process 200 for determining a rank score for a content item. Operations of the process 200 can be implemented, for example, by a data processing apparatus, such as the performance predictor 132 of FIG. 1. The process 200 can also be implemented by instructions stored on computer storage medium, where execution of the instructions by a data processing apparatus cause the data processing apparatus to perform the operations of the process 200.

A bid value is identified for the content item (202). The bid value may be an interaction-based bid that specifies an amount that a content item provider is willing to pay for an interaction with the content item. For example, the bid value may specify an amount the content item provider is willing to pay for each selection of the content item that occurs in response to the content item being displayed. The content item provider may provide the bid value to the performance predictor 132. The performance predictor 132 may store the bid value as campaign data 136 with a reference to the content item.

A predicted performance measure is identified for the content item (204). As described above, the performance predictor 132 can predict the performance of a content item using data regarding the content item (e.g., features such as type, topic, category, template, etc.), features of content item slots in which the content item may be displayed (e.g., size, type, number of content item slots on the resource, topic of the resource, etc.), and/or features of the content item provider that provided the content item (e.g., category of provider, historical content item performance, etc.). In some implementations, the performance predictor 132 applies a model to feature values that specify features for the content item, content item slots, and/or content item provider. For example, the model may be trained to predict a performance measure for a content item using these types of features, and may be trained using feature values for features of content items having a known actual performance measure.

In some implementations, the predicted performance measure is determined prior to a ranking process and stored as performance data 138. The predicted performance measure may also be received from another source, such as the content item provider or another source that predicts performance measures for content items.

The predicted performance measure for the content item is adjusted using a weighting factor and/or adjustment factors (206). In some implementations, the performance predictor 132 may weight the predicted performance measure relative to a bid value for the content item using a weighting factor. For example, the predicted performance measure may be raised to a power that is equal to or proportional to the weighting factor. The weighting factor may vary between a value of one and a value less than one, such as zero.

The weighting factor may be based on, or indicative of, a confidence that the predicted performance measure will match an actual performance measure for the content item. For example, the weighting factor that is used to weight a predicted performance measure that has a high level of confidence (e.g., greater than a threshold confidence level) may be equal to, or close to, a value of one. Conversely, the weighting factor that is used to weight a predicted performance measure that has a low level of confidence (e.g., less than a threshold confidence level) may have a value that is significantly less than one, such as zero.

The weighting factor may also be based on predicted and actual performance measures for content items in a set of content items, such as a set of content items that share one or more characteristics in common with the content item. An example process for determining a weighting factor for a content item is described below with reference to FIG. 3.

The predicted performance measure may also be adjusted using one or more adjustment factors. Like the weighting factor, the adjustment factors may be based on the confidence that the predicted performance measure will match an actual performance measure for the content item and/or predicted and actual performance measures for content items in the set of content items. An adjustment factor may also be based on the weighting factor. Rather than to weight the predicted performance measure as the weighting factor was used above, the adjustment factors may be used to scale the predicted performance measure. For example, the weighted predicted performance measure (as weighted using the weighting factor) may be multiplied by the adjustment factors to scale the performance measure. This scaling allows rank scores that are based on predicted performance measures and interaction-based bids to be consistent with rank scores based on impression-based bids. Example processes for determining adjustment factors for a content item are described below with reference to FIG. 3.

In some implementations, the performance predictor 132 may adjust the predicted performance measure using Relationship (1) below:

$$\text{Relationship: APM}=\text{PM}^{WF}*\text{AF} \tag{1}$$

In Relationship 1, the variable "APM" denotes the adjusted performance measure, the variable "PM" denotes the predicted performance measure, the variable "WF" is the weighting factor, and the variable "AF" denotes an adjustment factor. Thus, in this example, the predicted performance measure "PM" is exponentially adjusted by the weighting factor "WF" and multiplied by the adjustment factor "AF" to determine the adjusted predicted performance measure "APM".

A rank score is determined for the content item using a bid value and the adjusted predicted performance measure (208). In some implementations, the content distribution system 130 can determine the rank score by determining a product of (or some other mathematical combination of) the bid value and the adjusted predicted performance measure. For example, the rank score may be equal to or proportional to the product. In some implementations, the bid value is a cost-per-click bid and the adjusted predicted performance measure is an adjusted predicted click-through rate.

Figure 3:
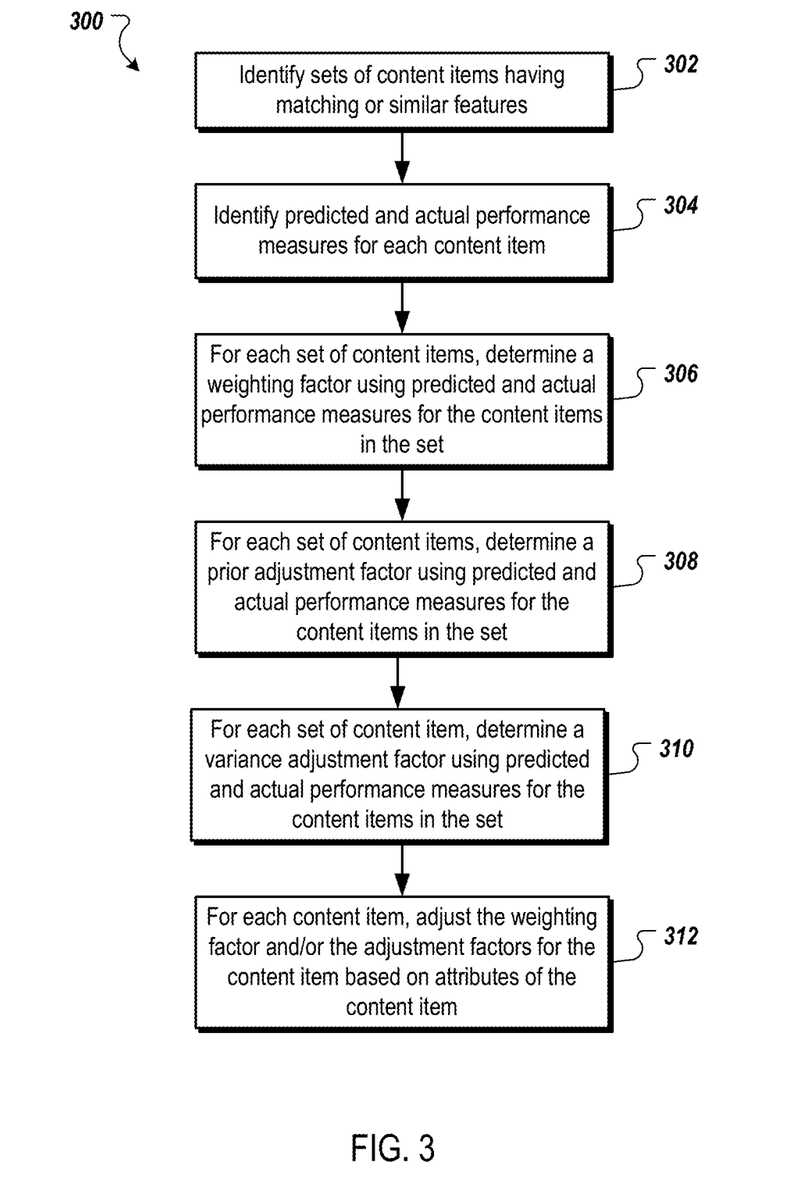
FIG. 3 is a flow chart of an example process for determining a weighting factor and adjustment factors for adjusting predicted performance measures of content items.

FIG. 3 is a flow chart of an example process 300 for determining a weighting factor and adjustment factors for adjusting predicted performance measures of content items. Operations of the process 300 can be implemented, for example, by a data processing apparatus, such as the performance predictor 132 of FIG. 1. The process 300 can also be implemented by instructions stored on computer storage medium, where execution of the instructions by a data processing apparatus cause the data processing apparatus to perform the operations of the process 300.

In this example process 300, a weighting factor and two adjustment factors (a prior adjustment factor and a variance adjustment factor) are determined for sets of content items. For example, content items may be organized into sets based on their characteristics. The weighting and adjustment factors for each particular set are determined based on data regarding the content items included in the set. These weighting and adjustment factors for a set of content items are then adjusted for each particular content item within the set based on characteristics of the particular content item that are indicative of a level of confidence in the particular content item's predicted performance measure. The weighting and adjustment factors for the particular content item can be used to adjust the predicted performance measure for the particular content item. The adjusted predicted performance measure can be used in combination with an interaction-based bid value to determine a rank score for the content item.

Sets of content items having matching or similar characteristics are identified (302). In some implementations, the performance predictor 132 can identify the sets based on one or more characteristics of the content items. For example, each set of content items may be for a particular content item provider. The set of content items for a particular content item provider may include content items that are part of the campaign data 136 for the particular content item provider. The content items may also be organized into sets based on the type of content item (e.g., text, image, video, flash, HTML, or dynamic image) a category or topic of the content item (e.g., sports, travel, events, etc.), a type of template used to generate the content items, a type of user device used to view the content item or for which the content item was designed (e.g., mobile device, tablet computer, or desktop computer), other characteristics of the content items, or a combination thereof. For example, there may be a set for image content items related to sports that are designed for presentation on tablet computers. In some implementations, all content items stored in the campaign data 136 constitute a single set of content items.

For each content item, predicted and actual performance measures are identified (304). In some implementations, the performance predictor 132 identifies actual and predicted performance measures for each impression of a content item. For example, the performance predictor 132 can determine the predicted performance of a content item in response to a content item request for which that content item is eligible. In other words, the performance predictor 132 can determine the predicted performance before a content item is provided for presentation in response to a particular content item request.

The predicted performance measure can be determined, for example, using data regarding the content item (e.g., features such as type, topic, category, template, etc.), features of content item slots in which the content item may be displayed (e.g., size, type, number of content item slots on the resource, topic of the resource, etc.), and/or features of the content item provider that provided the content item (e.g., category of provider, historical content item performance, etc.). The predicted performance measure for each impression of a content item (e.g., each time that the content item is provided) can be stored as performance data 138 for the content item.

The content distribution system 130 can also receive data regarding user interactions with the content item. For example, the content distribution system 130 may store, for each impression of a content item, data specifying whether the content item was selected in response to being displayed. This interaction data can be obtained, for example from a data store, and used to determine an average actual performance measure for the content item, such as an average click-through rate for the content item. Other actual performance measures can similarly be determined. For example, a median, standard deviation, or other measures of historical performance can be actual measures of performance that are determined for a content item.

For each identified set of content items, a weighting factor is determined using predicted and actual performance measures for the content items in the set (306). The weighting factor may be based on a mathematical variance in the actual performance measures for the content items in the set ("first variance value"). In addition, or in the alternative, the weighting factor may be based on a mathematical variance in the difference between a function of the predicted performance measure and a function of the actual performance measure for the content items in the set ("second variance value").

To determine the first variance value, the performance predictor 132 may determine, for each content item in the set, an average of the actual performance measures for the content item. The average actual performance measure ("AAPM") for a particular content item may be taken across all impressions of the particular content item. The performance predictor 132 may compute, for each content item in the set, a function of average actual performance measure ("actual function value"). In some implementations, the function is a logarithmic function. For example, the actual function value for a content item may be proportional to, or equal to, log(AAPM), where "AAPM" is the average actual performance measure for the content item. The performance predictor 132 can determine the first variance value by computing a mathematical variance in the actual function values for the content items in the set.

To determine the second variance value, the performance predictor 132 may determine, for each content item in the set, an average of the predicted performance measures for the content item. The average predicted performance measure ("APPM") for a particular content item may be taken across all impressions for the particular content item (or all impressions for which a predicted performance measure was determined). The performance predictor 132 may compute, for each content item in the set, a function of average predicted performance measure ("predicted function value"). This function may also be a logarithmic function. For example, the predicted function value for a content item may be proportional to, or equal to, log(APPM), where "APPM" is the average predicted performance measure for the content item.

For each content item in the set, the performance predictor 132 determines a difference value. The difference value for a content item may be the mathematical difference between the predicted function value and the actual function value for the content item. The second variance value may be proportional to (or equal to) a mathematical variance in the difference values.

The weighting factor for the set of content items may be proportional to (or equal to) the first variance value divided by a sum of the first variance value and the second variance value. For example, the weighting factor may be determined using Relationship (2) below:

$$\text{Relationship: } WF = \frac{FVV}{FVV + SVV} \quad (2)$$

In Relationship (2), "WF" denotes the weighting factor, "FVV" denotes the first variance value, and "SVV" denotes the second variance value. Substituting the relationships that can be used to determine the first and second variance values, Relationship (2) can be rewritten as shown in Relationship (3) below:

$$\text{Relationship: } WF = \frac{\text{var}(f(AAPM))}{\text{var}(f(AAPM)) + \text{var}(f(AAPM) - f(APPM))} \quad (3)$$

In Relationship (3), "WF" denotes the weighting factor, "f(AAPM)" denotes a function of the average actual performance measure for content items in the set, and "f(APPM)" denotes a function of the average predicted performance measure for content items in the set. As described above, these functions can be logarithmic functions.

For each set of content items, a prior adjustment factor is determined using the predicted and actual performance measures for the content items in the set (308). The prior adjustment factor may be based on the weighting factor for the set of content items and a function of the actual performance measures (e.g., actual function values described above) for the content items in the set. For example, the performance predictor 132 may determine the prior adjustment factor using Relationship (4) below:

$$\text{Relationship: } PAF = (\exp(\text{mean}))^{(1-WF)} \quad (4)$$

In Relationship (4), "PAF" denotes the prior adjustment factor, the variable "mean" denotes an average for the actual function values, and "WF" denotes the weighting factor. Thus, the prior adjustment factor can be equal to (or proportional to) an exponential function of the variable "mean" that is raised to a power proportional to a difference between the constant "1" and the weighting factor.

For each set of content items, a variance adjustment factor is determined using the predicted and actual performance measures for the content items in the set (310). The variance adjustment factor may be based on the first and second variance values described above. For example, the performance predictor 132 may determine the variance adjustment factor using Relationship (5) below:

$$\text{Relationship: } VAF = \exp\left(\frac{FVV * SVV}{X * (FVV + SVV)}\right) \quad (5)$$

In Relationship (5), "VAF" denotes the variance adjustment factor, "FVV" denotes the first variance value, "SVV" denotes the second variance value, and "X" is an adjustable variable. For example, the variable "X" may be an integer, such as one, two, three, or some other integer. Thus, the variance adjustment factor can be equal to (or proportional to) an exponential function of a variance product (e.g., a value that is proportional to a product of the first and second variance values) divided by a variance sum (e.g., a value that is proportional to a sum of the first and second variance values).

The weighting factor, prior adjustment value, and variance adjustment factor for a set of content items can be used to weight and adjust a predicted performance measure for a content item in the set. The weighted and adjusted predicted performance measure can be used in combination with an interaction-based bid value to determine a rank score for the content item. For example, the content distribution system 130 may use Relationship (6) below to determine a rank score for a content item:

$$\text{Relationship } RS = B * PM^{WF} * PAF * VAF \quad (6)$$

In Relationship (6), "RS" denotes the rank score for a content item, "B" denotes a bid value for the content item, "PM" denotes the predicted performance measure for the content item, "WF" denotes the weighting factor for a set of content items in which the content item is a member, "PAF" denotes the prior adjustment factor for the set of content items, and "VAF" denotes the variance adjustment factor for the set of content items.

Relationship (6) allows for the predicted performance measure of a content item to be adjusted based on a measure of confidence that the predicted performance measure of the content item will match the actual performance measure of the content item. For example, the weighting factor can be adjusted such that it has a value close to one if there is a high level of confidence in the predicted performance measure and such that it has a value significantly less than one if there is a significant amount of uncertainty about the predicted performance measure. As the characteristics of a content item may be indicative of the level of confidence one should have in the predicted performance measure for the content item, these characteristics can be used to adjust one or more of the parameters of Relationship (6) for that content item.

For each content item, the weighting factor, prior adjustment factor, the variance adjustment factor and/or a parameter thereof for the set of content items in which the content item is a member is adjusted based on characteristics of the content item (312). Each set of content items can have an associated weighting factor, prior adjustment factor, and/or variance adjustment factor that applies to each content item that is a member of the set. These factors can be adjusted for each particular content item in the set based on characteristics of the content item to reflect a level of confidence in the predicted performance measure for the content item. Thus, each particular content item can have an associated weighting factor, prior adjustment factor, and variance adjustment factor that has been determined using the weighting factor, prior adjustment factor, and prior adjustment factor, respectively, from the set of content items in which the particular content item is a member.

An example characteristic of a content item that can be used to adjust the weighting and adjustment factors includes the type of content item. In some implementations, the weighting and adjustment factors can be adjusted based on whether the content item is a text content item, a video content item, an image content item, a flash content item, an HTML content item, a dynamic image content item, an advertisement or some other type of content item. For example, the performance predictor 132 may determine the weighting and adjustment factors for a set of content items that are assigned to a travel category. The performance predictor 132 may then adjust these factors for each content item in the set based on the type of content item. For example, predicted performance measures for text-based content items may be considered more reliable (and, thus have a higher level of confidence) than predicted performance measures for flash-based content items. In this example, the performance predictor 132 may increase the weighting factor for each text-based content item in the set. The performance predictor 132 may also decrease the weighting factor for each flash-based content item in the set.

Another example characteristic of a content item that can be used to adjust the weighting and adjustment factors includes a selection count that specifies the number of interactions (e.g., selections) the content item has received in response to being displayed. For example, there may be more confidence in a predicted performance measure for a content item that has received a large number of interactions (e.g., greater than a threshold number of interactions) than the confidence in a predicted performance measure for a content item that has received a small number of interactions (e.g., less than a threshold number of interactions). Thus, the performance predictor 132 may increase the weighting factor for content items that have received a large number of interactions and reduce the weighting factor for content items that have received few interactions.

An impression count that specifies the number of impressions the content item has received (e.g., the number of times the content item has been displayed) can also be used to adjust the weighting and adjustment factors for the content item. For example, there may be more confidence in a predicted performance measure for a content item that has received a large number of impressions (e.g., greater than a threshold number of impressions) than the confidence in a predicted performance measure for a content item that has received a small number of impressions (e.g., less than a threshold number of impressions). Thus, the performance predictor 132 may increase the weighting factor for content items that have received a large number of impressions and reduce the weighting factor for content items that have received few impressions.

Data regarding similar content items may also be used to adjust the weighting and adjustment factors for a content item. For example, although content item A has little interaction and impression data, content item B may have a large number of interactions and impressions. If content item A shares one or more characteristics with content item B, such as content item type, topic, or advertiser, then the number of impressions and/or the number of interactions that content item B has received may be used to adjust the weighting and adjustment factors for content item A.

In some implementations, multiple predictors using different methodologies may be used to predict a performance measure for a content item. For example, a first machine learning system may predict a first predicted performance measure for the content item and a second machine learning system may predict a second predicted performance measure for the content item. The predicted performance measures can be compared to determine a level of agreement or a difference between the multiple predictors. This level of agreement can also be used to adjust the weighting and adjustment factors for the content item. For example, if the level of agreement is low (e.g., less than a threshold), there may be a low level of confidence in any of the predicted performance measures. Thus, the weighting factor for the content item's predicted performance measure may be reduced. Similarly, if the level of agreement is high, then the weighting factor may be increased as the level of confidence in the predicted performance measures may be higher.

As described above, the predicted performance measures, as weighted and adjusted, can be used to determine rank score for content items. A content item can be selected based on the rank scores and provided in response to a content item request.

Figure 4:
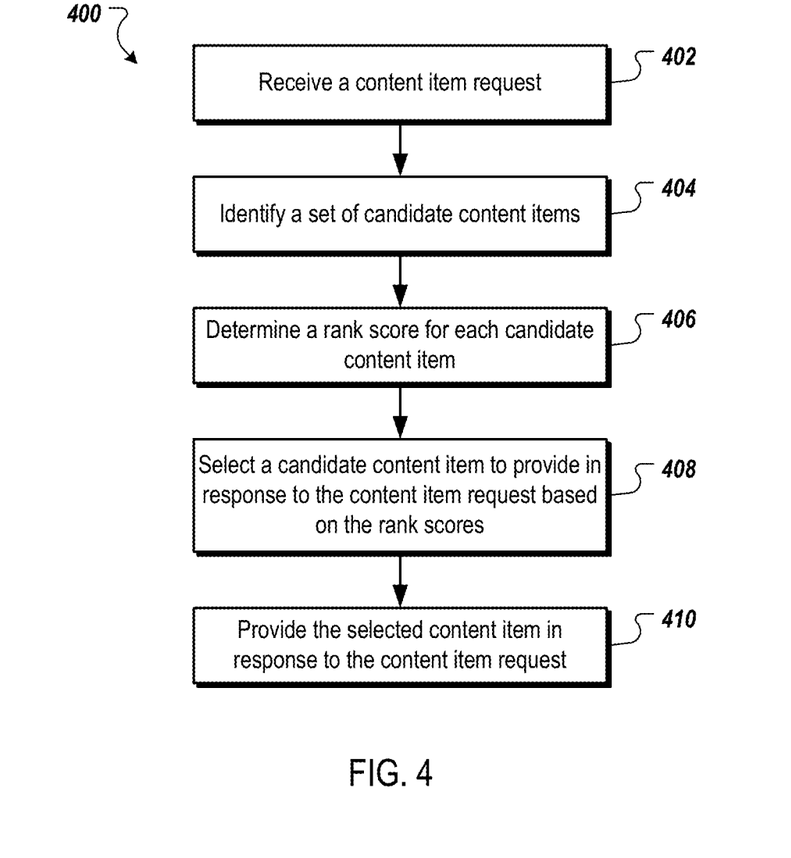
FIG. 4 is a flow chart of an example process for providing a content item.

FIG. 4 is a flow chart of an example process 400 for providing an advertisement. Operations of the process 400 can be implemented, for example, by a data processing apparatus, such as the content distribution system 130 of FIG. 1. The process 400 can also be implemented by instructions stored on computer storage medium, where execution of the instructions by a data processing apparatus cause the data processing apparatus to perform the operations of the process 400.

A content item request is received (402). In some implementations, the content distribution system 130 may receive a content item request from a user device 106. For example, the user device 106 may have requested a resource 105 that has one or more content item slots (e.g., advertisement slots). In response to receiving the resource, the user device 106 transmits a content item request to the content distribution system 130. The content item request may include data regarding the resource 105 (e.g., keywords included in the resource 105), and/or the content item slot(s), and data specifying the number of content items requested. If the content item slots are for a search results page, the content item request may include keywords of a query for which search results are being provided.

A set of candidate content items is identified (404). The candidate content items are content items that are eligible to be provided in response to the content item request. For example, the eligible content items may be content items for which an advertiser has provided bids for keywords that match keywords of the resource 105 or submitted query. The candidate content items may be eligible based on a match or relevancy between the resource 105 or content item slots and the content items. For example, an advertiser 108 may bid on content item slots of resources that are related to particular categories or topics.

A rank score is determined for each candidate content item (406). For a candidate content item having an associated impression-based bid (e.g., a cost-per-impression bid), the content item distribution system 130 may determine a rank score for the candidate content item using the value of impression-based bid. For candidate content items having an interaction-based bid (e.g., a cost-per-click bid), the content distribution system 130 may determine a rank score for the candidate content item using the value of the interaction-based bid and a predicted performance measure for the candidate content item. For example, the rank score for the candidate content item may be proportional to (or equal to) a product of the bid value and the predicted performance measure.

As described above, the predicted performance measure may be weighted and/or adjusted relative to the bid value when determining the rank score for a content item. For example, the predicted performance measure may be weighted and/or adjusted based on a confidence in the predicted performance measure for the content item, as described above. The example techniques for weighting and adjusting predicted performance measures described herein result in a rank score that allows content items that have an associated interaction-based bid to be ranked along with content items that have an associated impression-based bid. For example, the rank score for content items having both types of bids may be based on an expected value that will result from presenting the content item.

A candidate content item is selected based on the rank scores (408). If the content item request specified a single content item, then the candidate content item having the highest rank score may be selected. If the content item request specified a particular number of content items, then the content distribution system 130 may select that number of the candidate content items having the highest rank scores.

The selected content item(s) are provided in response to the content item request (410). In some implementations, the content distribution system 130 provides the selected content item(s) to the user device 106 from which the content item request was received. In turn, the user device 106 can present the content items in content item slots of a resource 105.

Figure 5:
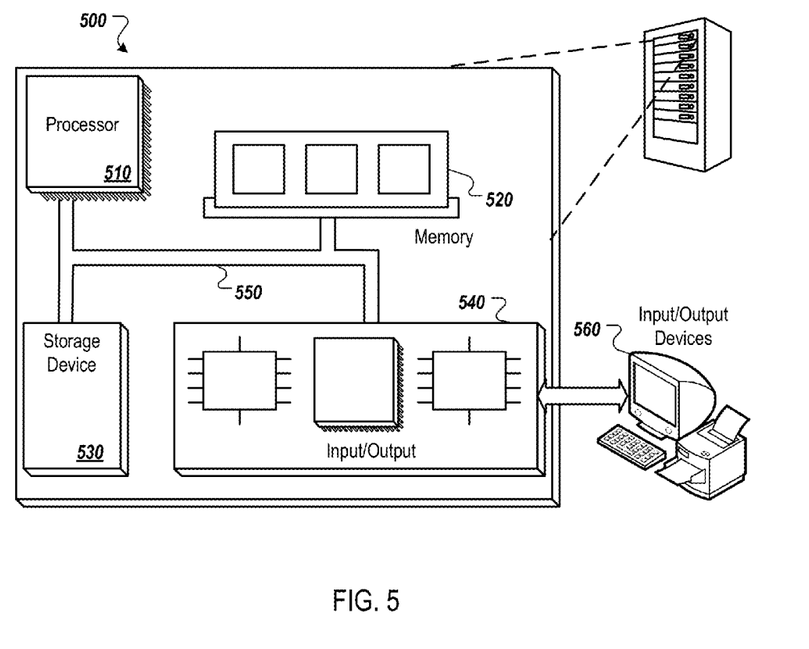
FIG. 5 is block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving, from a user device and over a data communication network, a content item request;
   identifying, in response to the content item request, eligible content items that are eligible for presentation in response to the content item request, the eligible content items including a given content item having a given characteristic;
   identifying, for the given content item, a bid value specifying an amount a content item provider is willing to pay for user interaction with the given content item;
   identifying, for the given content item, a predicted performance measure specifying a predicted performance for the given content item;
   identifying a first set of content items that have the given characteristic, the first set of content items including the given content item;
   determining, for the given content item, a weighting factor that is based on a variance in at least one performance measure for the content items in the first set of content items, the weighting factor for the given content item being different than a weighting factor for another eligible content item that is included in a second set of content items different from the first set of content items, the second set of content items including content items that do not have the given characteristic;
   adjusting, using weighting factor for the given content item, the predicted performance measure to generate an adjusted predicted performance measure;
   determining a rank score for the given content item using the bid value for the given content item and the adjusted predicted performance measure for the given content item; and
   providing, to the user device and based on the rank score for the given content item, data that initiates presentation of the given content item at the user device.

2. The method of claim 1, further comprising adjusting the weighting factor based on at least one of a type of the given content item, a selection count for the given content item that specifies a number of times the given content item has been selected in response to being displayed, and an impression count for the given content item that specifies a number times the given content item has been displayed.

3. The method of claim 1, further comprising adjusting the weighting factor based on at least one of a selection count that specifies a number of times a second content item that has a particular characteristic in common with the given content item has been selected in response to being displayed and an impression count that specifies a number of times that the second content item has been displayed.

4. The method of claim 1, further comprising:
   identifying a first predicted performance measure for the given content item using a first machine learning system;
   identifying a second predicted performance measure for the given content item using a second machine learning system different than the first machine learning system; and
   adjusting the weighting factor based on a difference between the first predicted performance measure and the second predicted performance measure.

5. The method of claim 1, wherein the weighting factor is based on a predicted performance measure for each content item in the first set of content items and an actual performance measure for each content item in the first set of content items.

6. The method of claim 5, wherein:
   the weighting factor is proportional to a first variance value divided by a sum of the first variance value and a second variance value,
   the first variance value is proportional to a variance in actual function values for two or more content items of the first set of content items, the actual function value for a particular content item of the two or more content items being a function of an average actual performance measure for the particular content item, and
   the second variance value is proportional to a variance in difference values for the two or more content items, the difference value for the particular content item being a difference between a predicted function value and the actual function value for the particular content item, the predicted function value being a function of an average predicted performance measure for the particular content item.

7. The method of claim 6, wherein adjusting the predicted performance measure for the given content item comprises raising the predicted performance measure for the given content item by an exponent with a value proportional to the weighting factor.

8. The method of claim 6, wherein adjusting the predicted performance measure for the given content item comprises adjusting the predicted performance measure using a first adjustment factor, the first adjustment factor being proportional to a first adjustment value raised by an exponent, and wherein:
   the first adjustment value is proportional to an exponential function of an average value, the average value specifying an average of the actual function values for the two or more content items, and
   the exponent is proportional to a difference between a constant and the weighting factor.

9. The method of claim 8, wherein adjusting the predicted performance measure for the given content item comprises adjusting the predicted performance measure using a second adjustment factor, the second adjustment factor being proportional to an exponential function of a second adjustment value, and wherein:
   the second adjustment factor is proportional to a variance product divided by a variance sum,
   the variance product is proportional to a product of the first variance value and the second variance value, and the variance sum is proportional to a sum of the first variance value and the second variance value.

10. The method of claim 1, wherein the variance in at least one performance measure for the content items in the first set of content items comprises a variance in actual performance measures for each content item in the first set of content items.

11. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving, from a user device and over a data communication network, a content item request;
identifying, in response to the content item request, eligible content items that are eligible for presentation in response to the content item request, the eligible content items including a given content item having a given characteristic;
identifying, for the given content item, a bid value specifying an amount a content item provider is willing to pay for user interaction with the given content item;
identifying, for the given content item, a predicted performance measure specifying a predicted performance for the given content item;
identifying a first set of content items that have the given characteristic, the first set of content items including the given content item;
determining, for the given content item, a weighting factor that is based on a variance in at least one performance measure for the content items in the first set of content items, the weighting factor for the given content item being different than a weighting factor for another eligible content item that is included in a second set of content items different from the first set of content items, the second set of content items including content items that do not have the given characteristic;
adjusting, using weighting factor for the given content item, the predicted performance measure to generate an adjusted predicted performance measure;
determining a rank score for the given content item using the bid value for the given content item and the adjusted predicted performance measure for the given content item; and
providing, to the user device and based on the rank score for the given content item, data that initiates presentation of the given content item at the user device.

12. The system of claim 11, wherein the instructions upon execution cause the data processing apparatus to perform further operations comprising adjusting the weighting factor based on at least one of a type of the given content item, a selection count for the given content item that specifies a number of times the given content item has been selected in response to being displayed, and an impression count for the given content item that specifies a number times the given content item has been displayed.

13. The system of claim 11, wherein the instructions upon execution cause the data processing apparatus to perform further operations comprising adjusting the weighting factor based on at least one of a selection count that specifies a number of times a second content item that has a particular characteristic in common with the given content item has been selected in response to being displayed and an impression count that specifies a number of times that the second content item has been displayed.

14. The system of claim 11, wherein the instructions upon execution cause the data processing apparatus to perform further operations comprising:
identifying a first predicted performance measure for the given content item using a first machine learning system;
identifying a second predicted performance measure for the given content item using a second machine learning system different than the first machine learning system; and
adjusting the weighting factor based on a difference between the first predicted performance measure and the second predicted performance measure.

15. The system of claim 11, wherein the weighting factor is based on a predicted performance measure for each content item in the first set of content items and an actual performance measure for each content item in the first set of content items.

16. The system of claim 15, wherein:
the weighting factor is proportional to a first variance value divided by a sum of the first variance value and a second variance value,
the first variance value is proportional to a variance in actual function values for two or more content items of the first set of content items, the actual function value for a particular content item of the two or more content items being a function of an average actual performance measure for the particular content item, and
the second variance value is proportional to a variance in difference values for the two or more content items, the difference value for the particular content item being a difference between a predicted function value and the actual function value for the particular content item, the predicted function value being a function of an average predicted performance measure for the particular content item.

17. The system of claim 16, wherein adjusting the predicted performance measure for the given content item comprises adjusting the predicted performance measure using a first adjustment factor, the first adjustment factor being proportional to a first adjustment value raised by an exponent, and wherein:
the first adjustment value is proportional to an exponential function of an average value, the average value specifying an average of the actual function values for the two or more content items, and
the exponent is proportional to a difference between a constant and the weighting factor.

18. The system of claim 17, wherein adjusting the predicted performance measure for the given content item comprises adjusting the predicted performance measure using a second adjustment factor, the second adjustment factor being proportional to an exponential function of a second adjustment value, and wherein:
the second adjustment factor is proportional to a variance product divided by a variance sum,
the variance product is proportional to a product of the first variance value and the second variance value, and
the variance sum is proportional to a sum of the first variance value and the second variance value.

19. A computer storage medium encoded with a computer program, the program comprising instructions that when executed by a data processing apparatus cause the data processing apparatus to perform operations comprising:
receiving, from a user device and over a data communication network, a content item request;

identifying, in response to the content item request, eligible content items that are eligible for presentation in response to the content item request, the eligible content items including a given content item having a given characteristic;

identifying, for the given content item, a bid value specifying an amount a content item provider is willing to pay for user interaction with the given content item;

identifying, for the given content item, a predicted performance measure specifying a predicted performance for the given content item;

identifying a first set of content items that have the given characteristic, the first set of content items including the given content item;

determining, for the given content item, a weighting factor that is based on a variance in at least one performance measure for the content items in the first set of content items, the weighting factor for the given content item being different than a weighting factor for another eligible content item that is included in a second set of content items different from the first set of content items, the second set of content items including content items that do not have the given characteristic;

adjusting, using weighting factor for the given content item, the predicted performance measure to generate an adjusted predicted performance measure;

determining a rank score for the given content item using the bid value for the given content item and the adjusted predicted performance measure for the given content item; and providing, to the user device and based on the rank score for the given content item, data that initiates presentation of the given content item at the user device.

20. The computer storage medium of claim 19, wherein:

the weighting factor is proportional to a first variance value divided by a sum of the first variance value and a second variance value, the first variance value is proportional to a variance in actual function values for two or more content items of the first set of content items, the actual function value for a particular content item of the two or more content items being a function of an average actual performance measure for the particular content item, and the second variance value is proportional to a variance in difference values for the two or more content items, the difference value for the particular content item being a difference between a predicted function value and the actual function value for the particular content item, the predicted function value being a function of an average predicted performance measure for the particular content item.

* * * * *